Dec. 12, 1933.  C. J. OXFORD ET AL  1,938,718
INTERLOCKING ADJUSTABLE MEMBER
Filed Nov. 11, 1929
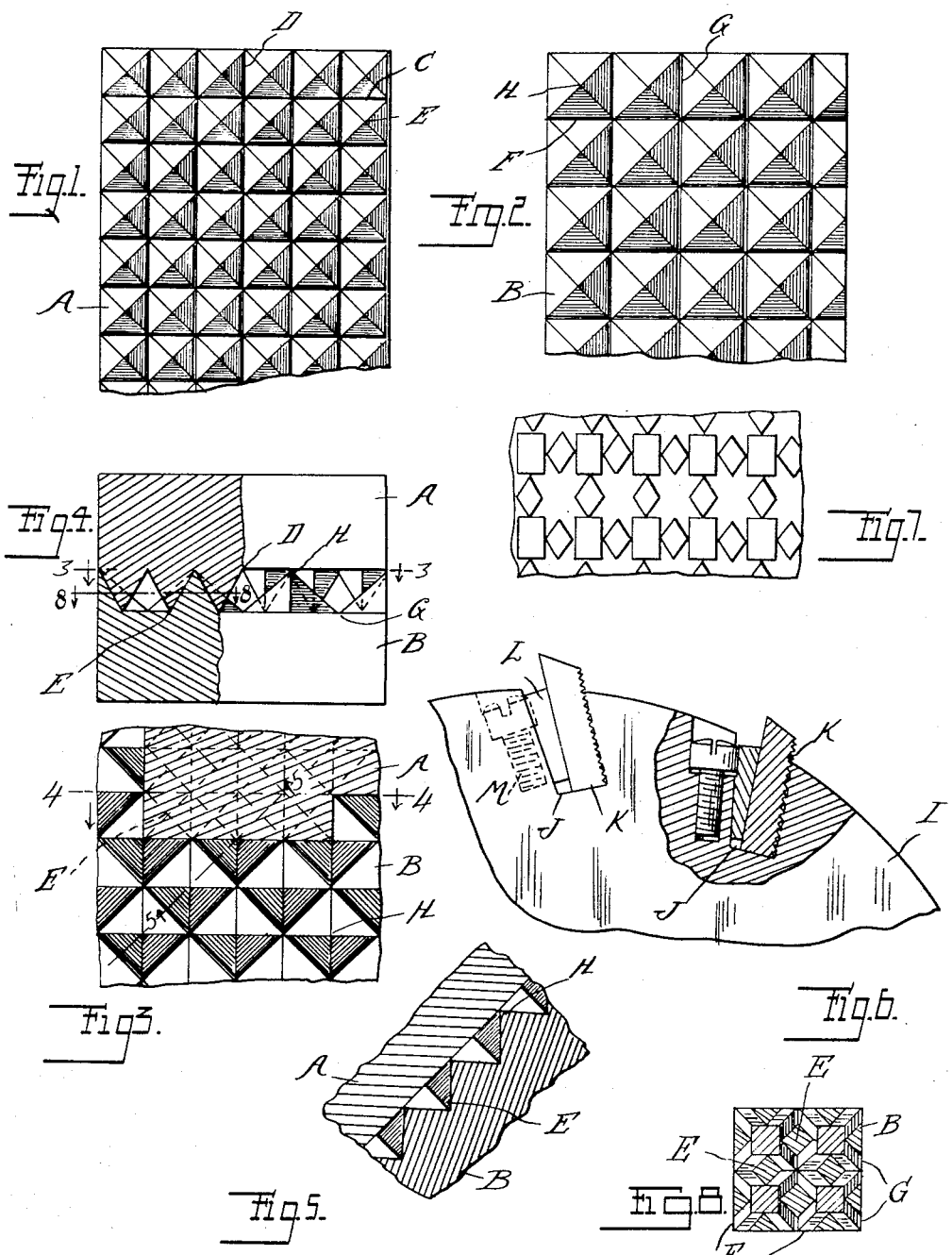
INVENTORS
Carl J. Oxford
George H. Hayden
BY Whittemore Hulbert
Whittemore & Belknap
ATTORNEYS Patented Dec. 12, 1933

1,938,718

UNITED STATES PATENT OFFICE 1,938,718

INTERLOCKING ADJUSTABLE MEMBER

Carl J. Oxford and George D. Hayden, Detroit, Mich., assignors to National Twist Drill & Tool Company, Detroit, Mich., a corporation of Michigan Application November 11, 1929
Serial No. 406,458

5 Claims. (Cl. 29—105)

The invention relates to interlocking adjustable members such for instance as an adjustable cutting tool and its holder. It is the primary object of the invention to obtain a construction in which the co-operating members may be adjusted by small steps and in transverse directions and will be accurately held from displacement in each position of adjustment. It is a further object to obtain a construction which may be readily manufactured by milling or other machining operations. To this end the invention consists in the construction as hereinafter set forth.

In the drawing:

Figures 1 and 2 are plan views respectively of the abutting faces of the two members;

Figure 3 is a sectional plan view showing the two members in engagement;

Figures 4 and 5 are cross sections on lines 4—4 and 5—5 of Figure 3;

Figure 6 is a section showing the improvement applied to a milling cutter.

Figure 7 is a diagrammatic view showing a modified construction with the projections of one member in interlocking engagement with those of the other.

Fig. 8 is a cross section on line 8—8 of Fig. 4.

For many uses, as for instance in the setting of a cutter blade, it is desirable to provide for adjustment along transverse axes and also to rigidly hold the member in whatever position it may occupy. Still further it is desirable to accomplish this result by a construction which may be easily manufactured with great accuracy and without complication in the construction of the mounting and holding means. These results are obtained with our improved construction which consists essentially in co-operating members having their abutting faces transversely grooved to form polygonal projections preferably pyramidal so fashioned that the projections of one member will interlock with those of the other in each position of adjustment along transverse axes. In order, however, to obtain this interlocking engagement the pyramidal projections of the respective members must be dissimilar as otherwise the groove along one axis would destroy the locking effect along the transverse axis. It is also important that these dissimilar projections should accurately engage and interlock and that the construction should be one permitting of formation through ordinary milling or machining operations.

As illustrated in Figures 1 and 2, A and B are the respective members. The member A has formed therein a series of parallel V-shaped grooves C extending longitudinally thereof and a series of similar grooves D extending perpendicular to the grooves C. This results in the formation of a series of pyramidal projections E, each of which has a square base and tapers to a point. The member B is provided with a series of parallel V-shaped grooves F which, however, are arranged at an angle of forty-five degrees to the grooves C of the member A and a second series of parallel V-shaped grooves G perpendicular to the grooves F and arranged at forty-five degrees in relation to the grooves D of the member A. These intersecting grooves also form pyramids H having square bases, but the diameter of the base is greater than the diameter of the base of the pyramid E and is in fact equal to the diagonal of the latter. Also the angle of the sides of the pyramids H differs from the angle of the sides of the pyramids E but corresponds to the angle of the edge or corner thereof. Thus when the two members A and B are placed in contact the corner edges of the pyramids E will contact with the sides of the pyramids H to produce an interlocking engagement.

The construction as above described can be easily manufactured by milling across the surfaces of the members in transverse directions and it is entirely immaterial as to the dimensions or the shape of the members so treated. Also while we have shown and preferably use a construction where the transverse grooves are perpendicular to each other, this is not essential. Neither is it essential that the pyramids of the respective members should be of the same form, it being only necessary that when engaged those on the one member will interlock with those of the other members in each position of adjustment.

One specific application of our invention is in the mounting of the blades of a milling cutter upon the body thereof. As shown in Figures 6, I is the body of a rotary milling cutter having notches J therein in which the cutter blades K are placed. One face of the notch J is formed with transverse grooves C and D as shown in the member A while the adjacent face of the cutter blade is formed with transverse grooves F and G as shown in the member B. The blades are clamped in position by wedges L and clamping screws M or any other suitable means. Thus with this construction to adjust the blade the screw M is loosened, the wedge L removed and the blade can then be adjusted either longitudinally or transversely to the desired position and again clamped.

In the modified construction shown in Figure 7, instead of arranging the grooves in each member perpendicular to each other, the grooves of one member are arranged at different angles so as to form diamond shaped projections. Furthermore, instead of forming these projections of pyramidal shape their sides are parallel to or substantially parallel to their axes so as to form polyhedrons. These are dissimilar in the two members but are adapted to interlock with each other. Obviously many other constructions may be formed, all of which may be capable of adjustment along transverse axes and will interlock at each point of adjustment, and it is immaterial whether the grooves which form these projections are at any particular angle to each other or are straight or curved lines.

What we claim as our invention is:

1. The combination of a pair of members having contacting faces, the faces of said members having series of parallel grooves transverse to each other to form polygonal projections, the grooves of one member being at an angle of approximately forty-five degrees to the grooves of the other member and the dimension between opposite sides of the polygonal base in one member being substantially equal to the diagonal of the polygonal base of the other member.

2. The combination of a pair of members having contacting faces, said faces being provided with series of parallel V-shaped grooves transverse to each other to form pyramidal projections, the dimension between opposite sides of the pyramid base in one member being substantially equal to the diagonal of the pyramid base of the other member and the angle of the pyramid edge of said first member corresponding to the angle of the pyramid side of the second member to form an interlocking engagement between said members.

3. The combination of a pair of members having contacting faces, each of said faces having intersecting transverse grooves forming polygonal projections, the projections of one of said members engaging the intersection of the grooves in the other member and being of dimensions greater than the transverse cross section of each of said grooves to preclude displacement through either of said transverse grooves.

4. The combination of a pair of members having contacting faces, each of said faces having intersecting transverse grooves forming polygonal projections, the projections in one of said members being of greater cross sectional area than those of the other member in the plane of engagement therewith and with the edges of the projections of one member engaging the sides of those of the other member to form an interlock.

5. The combination of a pair of members having contacting faces, each of said faces having intersecting transverse grooves forming polygonal projections, the spacing of grooves in one member being of greater width than that of the grooves in the other member and arranged at an oblique angle thereto, the projections on the member having the wider spaced grooves engaging the intersection of the slots in the member having the narrower spaced grooves and being of an area in each plane of contact which precludes displacement through either of the intersecting grooves.

CARL J. OXFORD.
GEORGE D. HAYDEN.